(12) United States Patent
Safaee-Rad et al.

(10) Patent No.: US 9,179,060 B2
(45) Date of Patent: Nov. 3, 2015

(54) METHOD AND APPARATUS FOR CAMERA SHAKE EFFECT IMAGE STABILIZATION

(75) Inventors: Reza Safaee-Rad, Etobicoke (CA); Milivoje Aleksic, Richmond Hill (CA)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 11/862,621

(22) Filed: Sep. 27, 2007

(65) Prior Publication Data

US 2009/0086036 A1 Apr. 2, 2009

(51) Int. Cl.
*H04N 1/21* (2006.01)
*H04N 5/225* (2006.01)
*H04N 5/232* (2006.01)

(52) U.S. Cl.
CPC ......... *H04N 5/23222* (2013.01); *H04N 1/2145* (2013.01); *H04N 5/2253* (2013.01); *H04N 5/2257* (2013.01); *H04N 5/23212* (2013.01)

(58) Field of Classification Search
CPC . H04N 1/2145; H04N 5/2253; H04N 5/2257; H04N 5/23212; H04N 5/23222
USPC .................. 348/208.1, 208.12, 352, 354, 355
See application file for complete search history.

(56) References Cited

U.S. PATENT DOCUMENTS

| | | | | |
|---|---|---|---|---|
| 5,065,246 A * | 11/1991 | Takemoto et al. | ............ | 348/354 |
| 5,793,900 A * | 8/1998 | Nourbakhsh et al. | ......... | 382/263 |
| 7,027,087 B2 * | 4/2006 | Nozaki et al. | ............ | 348/231.99 |
| 7,227,576 B2 * | 6/2007 | Umeyama | ................ | 348/333.11 |
| 7,391,461 B2 * | 6/2008 | Ogino | ............................ | 348/345 |
| 2004/0130628 A1 * | 7/2004 | Stavely | ....................... | 348/208.4 |
| 2004/0228075 A1 * | 11/2004 | Moriguchi et al. | ........... | 361/680 |
| 2005/0243180 A1 * | 11/2005 | Yokonuma | .................. | 348/222.1 |
| 2006/0098237 A1 * | 5/2006 | Steinberg et al. | ............. | 358/302 |
| 2006/0146151 A1 * | 7/2006 | Moon et al. | .................... | 348/272 |
| 2006/0256396 A1 * | 11/2006 | Ejima et al. | ................... | 358/448 |
| 2006/0290821 A1 * | 12/2006 | Soupliotis et al. | ............. | 348/701 |
| 2007/0177021 A1 * | 8/2007 | Shan et al. | ............... | 348/208.12 |
| 2008/0106615 A1 * | 5/2008 | Ahonen et al. | ........... | 348/231.99 |
| 2008/0198243 A1 * | 8/2008 | Kijima | ..................... | 348/231.99 |

OTHER PUBLICATIONS

What is Optical Image Stabilizer?; Canon Inc.; 2007; pp. 1-3.
Kundur, Deepa et al.; Blind Image Deconvolution; IEEE; May 1996; pp. 43-64.
Elder, James H. et al.; Local Scale Control for Edge Detection and Blur Estimation; IEEE; vol. 20, No. 7; Jul. 1998; pp. 699-716.
Ben-Ezra, Moshe et al.; Motion-Based Motion Deblurring; IEEE; vol. 26, No. 6; Jun. 2004; pp. 689-698.
Darrell, Trevor et al.; Pyramid Based Depth from Focus; IEEE; 1998; pp. 504-509.
Liu, Xinqiao et al.; Simultaneous Image Formation and Motion Blur Restoration Via Multiple Capture; IEEE; 2001; pp. 1841-1844.
Patti, Andrew J. et al.; Superresolution Video Reconstruction with Arbitrary Sampling Lattices and Nonzero Aperture Time; IEEE; vol. 6, No. 8; Aug. 1997; pp. 1064-1076.

* cited by examiner

*Primary Examiner* — Jason Flohre (57) ABSTRACT

A method and apparatus for camera shake effect image stabilization determines a most favorable image sharpness metric out of image sharpness metrics from a plurality of images that were captured at a same lens position. A final image is selected based on the most favorable image sharpness metric.

39 Claims, 4 Drawing Sheets

METHOD AND APPARATUS FOR CAMERA SHAKE EFFECT IMAGE STABILIZATION

FIELD OF THE INVENTION

The present invention relates to digital cameras and photography on handheld devices, in particular image stabilization of digital photographs.

BACKGROUND OF THE INVENTION

Handheld, or mobile, devices such as mobile phones, personal digital assistants ("PDAs"), audio and/or video players and other handheld devices have transformed the modern world by providing many practical bundled features within a single package. One such feature is the built in camera. A typical camera for a mobile device is capable of performing still image and video capture. However, due to the limited space and battery life available for camera equipment within mobile devices, the photographic functionality is limited when compared to conventional digital cameras.

For instance, a mobile camera typical has a short, typically 2 to 6 mm, fixed focal length with a fixed aperture (e.g., f/#=2.8). In addition, a mobile device camera has limited memory and digital signal processor ("DSP") capabilities when compared to conventional digital cameras. Mobile device cameras are typically more inexpensive than conventional digital cameras as well.

One problem associated with all forms of handheld photography is hand shake blur. The movement of the camera due to a user hand shake during a picture capture creates a motion blur. Unlike other forms of motion blur, hand shake blur exhibits a random pattern and is difficult to predict based on past motion of the camera.

In the past, one solution that reduces the degree of hand shake blur is to capture images using shorter exposure intervals. This, however, increases the amount of noise in the image, especially in dark scenes. An alternative approach is to try to remove the blur off-line. Blur is usually modeled as a linear convolution of an image with a blurring kernel. Image deconvolution is the process of recovering the unknown image from its blurred version, given a blurring kernel. In most situations the blurring kernel is unknown as well, and the task also requires the estimation of the underlying blurring kernel. Such a process is usually referred to as blind deconvolution. However, blur caused by hand shake cannot be predicted as to direction and speed from one image to the next, which makes blind deconvolution less reliable.

Conventional digital cameras may employ techniques to reduce hand shake blur which are unavailable for mobile device cameras. One technique commonly known in the art is optical image stabilization (OIS). OIS attempts to stabilize the image by altering the optical path to the sensor within the lens itself. Typically hand shake is sensed using one or more gyroscopic sensors and a floating lens element is moved using electromagnets. Such additional components are not feasible in mobile phone cameras due to size and weight, expense and power consumption.

Another technique employed in conventional digital cameras to reduce hand shake blur is known as mechanical image stabilization where the sensor may be moved to counteract the motion of the camera. Manufacturers include components such as angle speed sensors, drive motors, and DSP chips to analyze motion and move the sensor accordingly. As with OIS technology, the size and weight, expense and power consumption of mechanical image stabilization precludes use in mobile device cameras.

Digital image stabilization is a technique where extensive image processing tries to use consecutive frames taken at a high speed, or various extrapolation techniques to reconstruct a less blurred image. However, a typical mobile device camera does not capture the appropriate frames per second to reconstruct an image adequately and the image processing required to extrapolate a less blurred image is expensive and can increase power consumption.

A need exists for hand shake image stabilization in mobile devices that may be robust, repeatable under various conditions and relatively inexpensive. The disclosed operations do not add size or weight and do not unnecessarily reduce battery life.

BRIEF DESCRIPTION OF THE DRAWINGS

The invention will be more readily understood in view of the following description when accompanied by the below figures and wherein like reference numerals represent like elements.

DETAILED DESCRIPTION

Generally, the present description provides a method and apparatus for camera shake effect image stabilization by determining image sharpness metric information, such as data representing a level of sharpness of an image, for each image in a set or group of images that were captured at a same lens position. A final image is selected from the set, where a set may be sequentially obtained frames along with corresponding image sharpness metric informations, as a stabilized image based on a most favorable image sharpness metric information. In one embodiment, the final image is selected by comparing image sharpness metric information associated with two images in the set and determining a most favorable image sharpness metric information between the two images and storing the most favorable image sharpness metric information and the associated image for comparison with other image metrics of subsequent frames or as a final image. This may be done in real time by an apparatus or offline by one or more other apparatus that analyzes the captured images from the first apparatus. In one example, images are captured during a camera shake condition after a camera lens has been focused (e.g., images captured with the lens at the same position).

In another embodiment, the first image of the set is stored and the associated image sharpness metric information is stored as a most favorable image sharpness metric information, the next image sharpness metric information of the next frame is compared to the most favorable image sharpness metric information and a new most favorable image sharpness metric information is determined. The most favorable image sharpness metric information and the next image sharpness metric information are updated and each updated next sharpness metric information of consecutive captured frames is compared to each updated most favorable image sharpness metric information until the set is empty. The remaining most favorable image sharpness metric information serves as the final most favorable image sharpness metric information.

In another embodiment, the method and apparatus for hand shake effect image stabilization provides for capturing a set of images during a camera shake condition after a camera lens has been focused and reusing the auto-focus image statistics logic to determine an image sharpness metric information for each image of the set. A final image from the set is selected as a stabilized image based on a most favorable image sharpness metric information.

Accordingly, the method and apparatus discussed herein allows for the reduction of hand shake effect and image stabilization of pictures taken using a handheld device and can solve one or more problems of speed, component size, and battery life present in the prior art.

As used herein, the terms "module," "circuit," "logic," and/or "stage" can include an electronic circuit, one or more processors (e.g., shared, dedicated, or group of processors such as but not limited to microprocessors, DSPs, or central processing units), and memory that execute one or more software or firmware programs, combinational logic circuits, ASICs and/or other suitable components that provide the described functionality.

The term "metric" as used herein, can include metric information generally, a single numeric value of a metric, or multiple numeric values of a metric associated with one or more images or any other suitable information used to represent the sharpness or clarity of an image.

The present disclosure can be more fully described with reference to FIGS. 1-4. In the following detailed description, numerous specific details are set forth in order to provide a thorough understanding of the present disclosure. It will be apparent to one of ordinary skill in the art, however, that these specific details need not be used to practice the present embodiments of the disclosure. In other instances, well-known structures, interfaces, and processes have not been shown or have not been shown in detail in order not to unnecessarily obscure the present disclosure.

Figure 1:
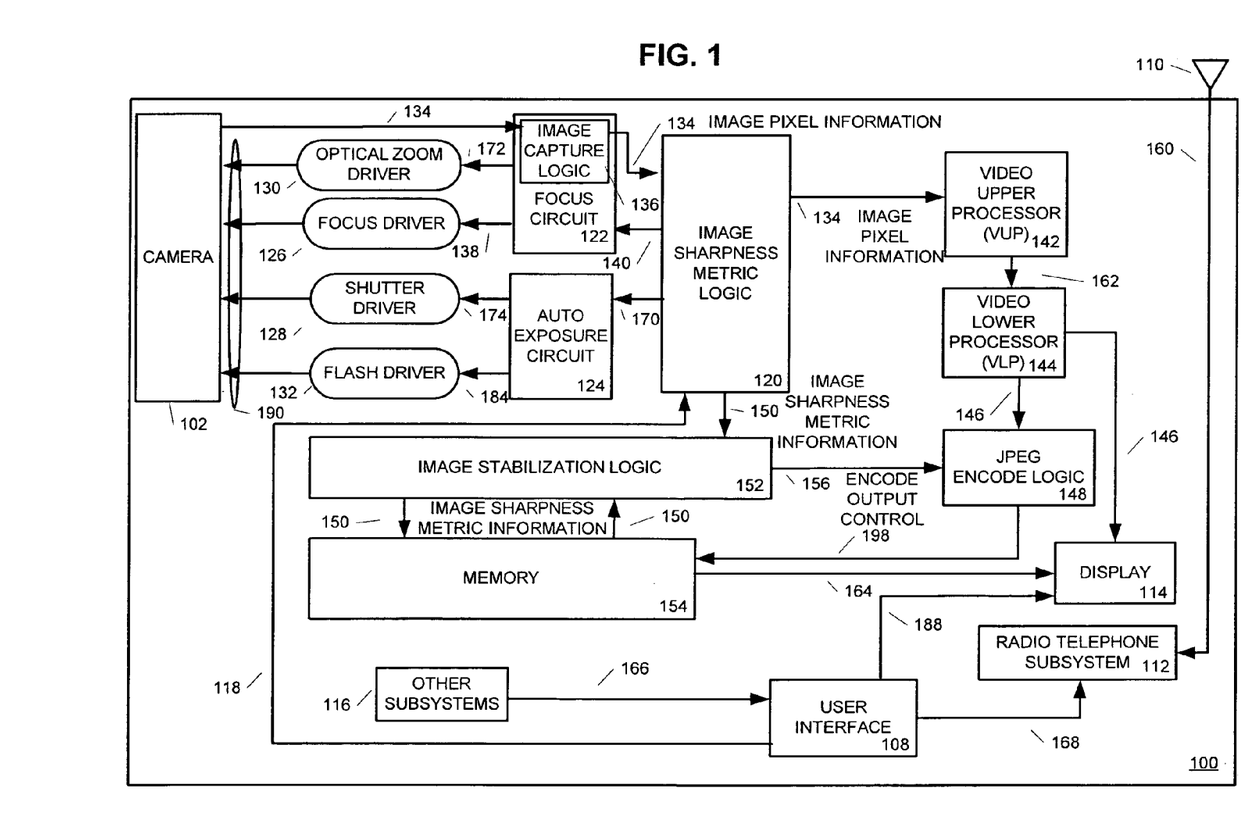
FIG. 1 is a block diagram illustrating one example of a mobile device for hand shake effect image stabilization in accordance with one embodiment of the present disclosure.

FIG. 1 illustrates a block diagram exemplifying one example of a handheld device 100, including a camera 102. The handheld device 100 may be a mobile phone, personal digital assistant ("PDA"), portable audio or video player (e.g., the Apple iPod), or other mobile devices with a camera accessory. The camera 102 is recognized in the art as typically a digital camera containing a charge-coupled device ("CCD") image sensor or a complementary metal oxide semiconductor ("CMOS") image sensor with a fixed focal length lens. However, any camera capable of the limited size and power consumption requirements of a handheld device may also be used.

In one example, the handheld device 100 may be a mobile phone and include an antenna 110 to communicate a radio signal 160 to a radio telephone subsystem 112 as known in the art. A user interface 108 provides for a user to access the features of the handheld device 100, such as operating an interface signal 168 to the radio telephone subsystem 112, or initiating the capture of an image with camera 102 through a shutter button signal 118. The user interface 108 typically connects the user to the handheld device 100 with a combination of components such as, but not limited to, keypads, buttons, and feedback 188 through display 114. It is recognized other user interface mechanisms, such as voice recognition and touch-screens, are widely available and known in the art and one having ordinary skill in the art will recognize any user interface suitable for a handheld device may be used. Display 114 may be any display suitable for handheld applications, such as, but not limited to, LCD (Liquid Crystal Display), LCD-TFT (LCD-Thin Film Transistor), OLED (Organic Light Emitting Diode), and FED (Field Effect Display). The display displays display data 164 stored in memory. Alternatively, other subsystems 116 may be provided to connect to the user interface 112 via a system bus 166. Other subsystems 116 may include, but are not limited to: audio players, video players, personal information managers ("PIMs"), voice recorders, internet access, or messaging applications In one example, a user initiates capturing of an image on the handheld device 100 through the user interface 108. For example, a half-press of a designated button may cause shutter button signal 118 to initiate an auto-focus routine, or a full-press may initiate an auto-focus routine then automatically move to a next step of the image capturing process. Additionally, user interface 108 may provide for a full-press of a designated button to capture a picture and may deactivate the full-press function until after a half-press auto-focus routine has been completed. In the example of FIG. 1, the shutter button signal 118 is received by image sharpness metric logic 120, in other embodiments auto-focus circuit 122 or auto exposure circuit 124 may receive the shutter button signal 118. It will be recognized that any suitable circuit may be used to initiate or carry out an auto-focus routine. A variety of auto-focus routines are commonly known in the art such as, but not limited to, a full-sweep method where the entire lens position range is scanned and a hill-climbing method where selected lens positions are scanned according to a variety of algorithms.

For example, a series of images are captured at varying lens positions and analyzed by the auto-focus circuit 122 or external logic connected to the auto-focus circuit for maximum sharpness. The auto-focus circuit 122 transmits focus driver signal 138 to the focus driver 126 which transmits lens position data to camera 102 through camera interface bus 190. In addition, in response to auto exposure control signal 170, auto exposure circuit 124 transmits shutter driver signal 174 to shutter driver 128 which transmits an open and close shutter command to camera 102 through camera interface bus 190 in order to capture images. In the present example, camera 102 is also connected to an optical zoom driver 130 and a flash driver 132 through camera interface bus 190 and controlled by optical zoom driver signal 172 and flash driver signal 184, respectively. Optical zoom drivers and flash drivers are well known in the art. However, it is recognized the present invention may be implemented without the optical zoom driver 130 or flash driver 132.

In one example, after information is transmitted to the focus driver 126 and shutter driver 128, an image is captured by camera 102 and image pixel information 134 is sent from camera 102 to image capture logic 136. It will be recognized by one having ordinary skill in the art that the image capture logic 136 may be implemented in a variety of ways and located within circuits other than the auto-focus circuit 122. The image pixel information 134 is transmitted to the image sharpness metric logic 120 where image sharpness metric informations of the image are calculated. For example, the image may be divided into regions of interest (ROIs) and statistical analysis performed on each ROI in series or in parallel. The pixel information may be scanned across the horizontal dimension of the image such that all ROIs in a row are processed simultaneously. It will be recognized by one having ordinary skill in the art that image sharpness metric information may be determined using a variety of methods.

As one example, an energy of Laplacian method (Squared Laplacian) can be used that calculates the metric information using the squared Laplacian g(x,y) of an image. In this example:

$$\text{Image Sharpness Metric Information is represented as a metric} = \Sigma_x \Sigma_y [g_{xx}, g_{yy}]^2$$

where
$g_{xx} = \delta^2/\delta x^2$, and
$g_{yy} = \delta^2/\delta y^2$.

A discrete Laplacian is approximated by the following kernels which include only vertical and horizontal neighbors:

$$\begin{matrix} 0 & 1 & 0 \\ 1 & -4 & 1 \\ 0 & 1 & 0 \end{matrix}$$

or $$\begin{matrix} 0 & -1 & 0 \\ -1 & 4 & -1 \\ 0 & -1 & 0 \end{matrix}.$$

To be more exhaustive, the following Laplacian kernels which include the diagonal neighbors can be used:

$$\begin{matrix} 1 & 1 & 1 \\ 1 & -8 & 1 \\ 1 & 1 & 1 \end{matrix}$$

or $$\begin{matrix} -1 & -1 & -1 \\ -1 & 8 & -1 \\ -1 & -1 & -1 \end{matrix}.$$

In situations where hardware limitations preclude use of the above kernels, a Laplacian operator in only one direction, such as horizontal along the pixel scanning, can be used:

$$\text{Metric} = \Sigma_x [g_{xx}]^2$$

As a result, the following Laplacian kernels along horizontal direction are to be used:

$$\begin{matrix} 1 & -2 & 1 \end{matrix}$$

or $$\begin{matrix} -1 & 2 & -1 \end{matrix}$$

The calculation of a metric for an image using a Laplacian operator horizontally along the pixel scanning thus becomes:

$$\text{Metric} = \Sigma [(P_{i-1} - 2*P_i + P_{i+1}) * (P_{i-1} - 2*P_i + P_{i+1})].$$

where $P_i$ is the value of the current pixel, $P_{i-1}$ is the value of the previous pixel and $P_{i+1}$ is the pixel value of the next pixel.

Another example of determining metrics is the energy of the Gradient of an image. The energy of Gradient of an image is defined as the square of Gradient of the image g(x, y) where:

$$\text{Metric} = \Sigma_x \Sigma_y [g_x g_y]^2$$

where
$g_x = \delta/\delta x$,
$g_y = \delta/\delta y$.

The discrete energy of Gradient along the horizontal direction is expressed as follows:

$$\text{Metric} = \Sigma [(P_{i+1} P_i) * (P_{i+1} - P_i)].$$

A metric of an image as defined above is a measure of the relative sharpness of an image. A focus metric and image sharpness metric may be calculated in the same manner.

In one example, the auto-focus circuit 122 will transmit a series of lens positions via focus driver signal 138 to the focus driver 126 based on the metric values of each image calculated by image sharpness metric logic 120. A step signal 140 from the image sharpness metric logic 120 communicates the relative image sharpness of the current image received from the image capture logic 136 and the previous image. For example, step signal 140 may be a command to step the lens position higher or lower, or step signal 140 may be a flag that the current or previous lens position is the most desired. Once auto-focus is complete, a final lens position is communicated to the focus driver 126 via focus driver signal 138.

In one example, after auto-focus circuit 122 has established a final lens position or focus position, a set or series of images is captured by receiving additional image pixel information 134 at image capture logic 136. The image pixel information 134 is then communicated to image sharpness metric logic 120. The image pixel information 134 may be stored in a memory location, or as shown in the example of FIG. 1, may be processed prior to storage.

In FIG. 1, a video upper processor (VUP) 142 receives the image pixel information 134. One having ordinary skill in the art will recognize the image pixel information 134 may be sent to the VUP 142 by the image sharpness metric logic 120 as shown, or the image pixel information 134 may be directly received from another circuit or logic such as image capture logic 136. In one example, image processing is further executed by transmitting an intermediate processed image pixel information 162 to a video lower processor (VLP) 144. Because the VUP 142 and VLP 144 are both processors, their image processing functions may be performed by one processor, or more than two processors as the application dictates. In other examples, a processor may be, but is not limited to, a field-programmable gate array (FPGA), a digital signal processor (DSP), a microprocessor or central processing unit (CPU), a microcontroller, a state machine, or any combination thereof on a single integrated circuit or multiple integrated circuits. In one example, the processed image pixel information 146 is encoded into an industry standard JPEG (Joint Photographic Experts Group) format in the JPEG encode logic 148 and transmitted on memory bus 198 to be stored in memory 154. Alternatively the processed image pixel information 146 may be displayed on display 114 either concurrently with the JPEG encoding at the JPEG encode logic 148, at a time before or after JPEG encoding, or displayed without JPEG encoding. In one embodiment, the image pixel information 134 is received at a VUP 142 as soon as image sharpness metric informations have been calculated. Alternatively, the VUP 142 may receive image pixel information 134 at the same time as the image sharpness metric logic 120. In other embodiments, other methods to synchronize the transfer of the image from image sharpness metric logic 120 to VUP 142 may be employed. For example, image sharpness metric logic 120 or VUP 142 may set a busy flag bit, or a separate register or buffer may be used. It will be recognized that the signal flow of the image pixel information 134 is not limited to the embodiments previously described, but may include any suitable signal flow capable of receiving multiple images and the associated image pixel information 134 and processing the images in accordance with the invention.

In one example, the image pixel information 134 is transmitted to the image sharpness metric logic 120 where image sharpness metric information of the image are calculated as during the auto-focus routine. In one embodiment, the image sharpness metric logic 120 re-uses statistical logic used to determine optimal focus position. This can result in cost saving, since separate statistical logic need not be employed. However, if desired, separate statistical logic may be used. As discussed earlier, the image may be divided into regions of interest (ROIs) and statistical analysis performed on each ROI in series or in parallel. The pixel information may be scanned across the horizontal dimension of the image such that all ROIs in a row are processed simultaneously.

Figure 2:
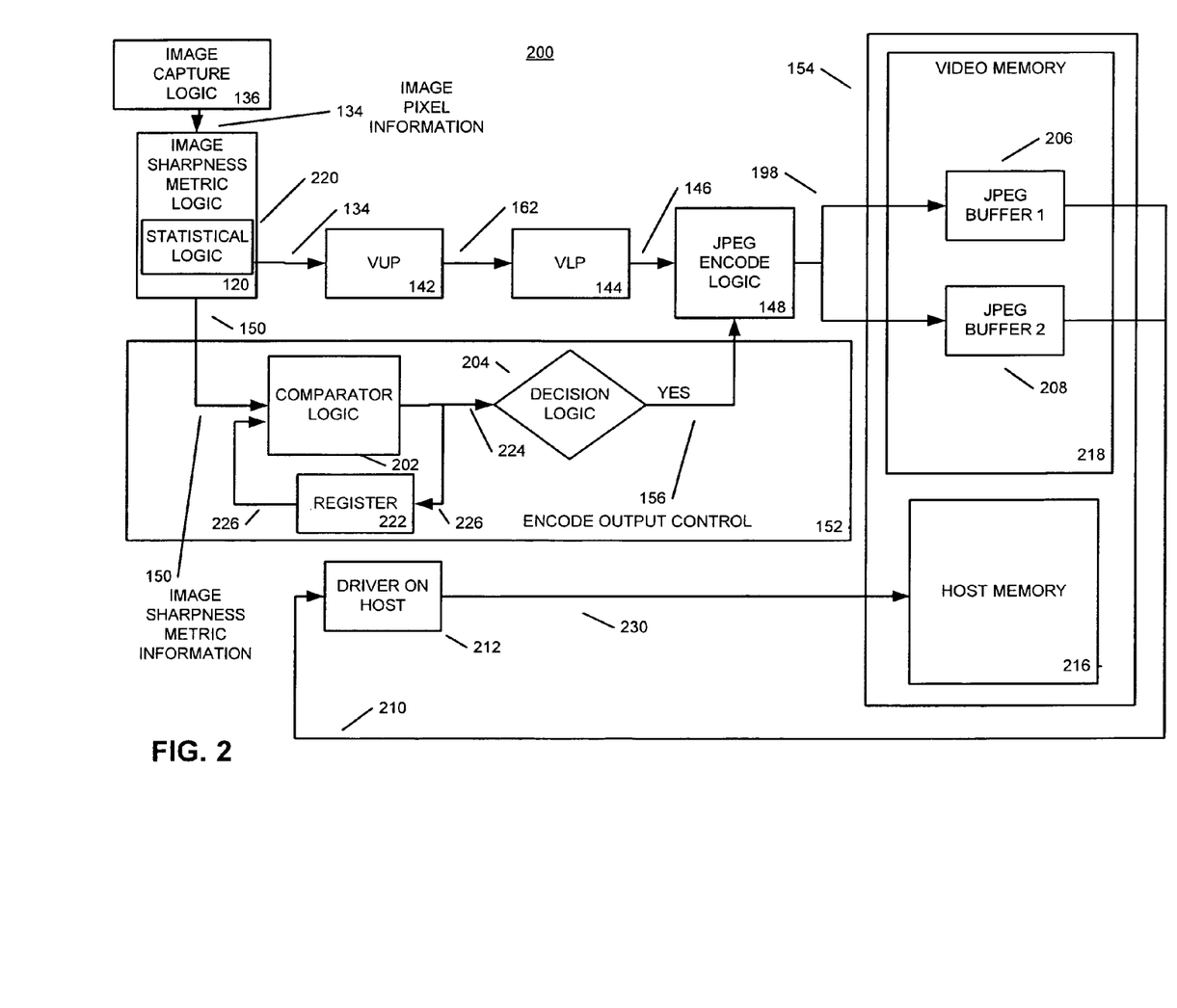
FIG. 2 is a block diagram illustrating one example of a circuit for hand shake effect image stabilization in accordance with one embodiment of the present disclosure.

In one example, the image sharpness metric logic 120 transmits image sharpness metric information 150 to image stabilization logic 152. For example, as pixel values of an image are retrieved, a mathematical operation is done to establish the image sharpness metric information of each pixel. Specifically, if the values of 3 consecutive pixels are 50 (previous), 120 (current) and 100 (next) and a Squared Laplacian sharpness metric is calculated along the horizontal direction (with kernel $-1, +2, -1$), the sharpness metric value of the current pixel is: $50*(-1)+120*(2)-100*(-1)=90$. The image sharpness metric information for an image or an ROI of an image is the total sharpness metric information of all pixels belonging to that image or that ROI. The sharper an image is, the higher the image sharpness metric value would be. The image stabilization logic 152 determines a most favorable image sharpness metric information from the set of captured images by comparing the value of the image sharpness metric informations for each image. The set may be a sequence of consecutive images and image sharpness information calculated for each consecutive image in the set. FIG. 2 illustrates an example of a method implemented in image stabilization logic 152. If image sharpness metric information 150 associated with a first captured image of the set is received by the image stabilization logic 152, then the image sharpness metric information 150 is stored as a most favorable image sharpness metric information. The next image sharpness metric information 150 received by the image stabilization logic 152 associated with the next image in the set is compared to the previously stored most favorable image sharpness metric information. The image sharpness metric information with the greater value is associated with an image having greater stability. The image sharpness metric information and associated image are retained as the new most favorable sharpness metric information. Each subsequent image sharpness metric information 150 is then received by the image stabilization logic 152 and compared to the most favorable image sharpness metric information. The most favorable sharpness metric information is updated after each comparison. The comparisons continue until the set of images is empty. The image stabilization logic 152 interfaces with memory 154 to store and retrieve current and previous image sharpness metric information 150. Suitable types of memory 154 for storing image sharpness metric information 150 include, but are not limited to, a register, nonvolatile or volatile random access memory (RAM), programmable read only memory (EPROM, EEPROM), or flash memory. In one example, the image stabilization logic 152 compares image sharpness metric information 150 for a current image and a previously stored most favorable image and the two image sharpness metrics information 150 are compared as the current image pixel information is being processed by the VUP 142, VLP 144 and JPEG encode logic 148. The image stabilization logic 152 outputs the result of the comparison as an encode output control signal 156 to the JPEG encode logic 148.

Based on the state of the encode output control signal, the JPEG encode logic 148 will either save the current JPEG encoded image to an overwrite location in memory 154, or will save the current JPEG encoded image as the new most favorable image replacing the previous most favorable image. When the set of images is empty, the image associated with the final most favorable image sharpness metric information is determined to be the stabilized image.

Referring now to FIG. 2, an exemplary functional block diagram 200 of the image stabilization logic 152, memory 154 and ancillary blocks is depicted. Incoming image pixel information 134 from image capture logic 136 is shown transmitted to the image sharpness metric logic 120 as previously illustrated in FIG. 1. In one example, the image pixel information 134 is at full resolution. The image sharpness metric logic 120 analyzes the image pixel information 136. In one example the image sharpness metric logic includes statistical logic 220. Several statistical algorithms used to calculate image metrics are commonly known in the art as previously discussed. In addition, the image pixel information 134 is communicated to the VUP 142, intermediate processed image pixel information 162 is communicated to VLP 144 and processed image pixel information 146 to JPEG encode logic 148 as discussed earlier. The image sharpness metric information 150 is received by the image stabilization logic 152 at comparator logic 202. In one example, the comparator logic 202 is a digital signal processor (DSP) and includes internal memory such as, but not limited to, register 222 sufficient to store an image sharpness metric information 150 associated with a plurality of images such that image sharpness metric information 150 from a current captured image may be compared with the previous image sharpness metric information 226 associated with a previously captured image. The image stabilization logic 152 also contains decision output logic 204 which receives the comparison result 224 from comparator logic 202. The decision output logic 204 performs an action dependent on whether the current image sharpness metric information 150 or previously stored most favorable image sharpness metric information is greater. For example, the decision output block 204 may transmit encode output control 156 to the JPEG encode logic 148 to either overwrite or keep a previously stored image with a new image 198 associated with a most favorable sharpness metric information.

In another example, memory 154 includes at least two JPEG buffers 206 and 208 located in video memory 218. It will be recognized JPEG buffers 206 and 208 may be located in any suitable type of memory such as, but not limited to, non-volatile or volatile RAM, flash memory, registers, or hard disk drives. When all images in the captured set of images have been compared, the remaining image with the most favorable image sharpness metric information is determined to be the final image. The final image pixel information 210 is transmitted to a host memory driver 212. In the current example, the final image pixel information 210 is in JPEG format, however one having ordinary skill in the art will realize any suitable image format such as, but not limited to, PGF (Progressive Graphics File), TIFF (Tagged Image File Format), RAW (proprietary format found on some conventional digital cameras), PNG (Portable Network Graphics), GIF (Graphic Interchange Format), or BMP (bit mapped) may be applied. The host memory driver 212 stores the final host image pixel information 230 to host memory 214. In one example, host memory 214 may be non-volatile RAM accessible by a user interface 108. However, other forms of memory such as, but not limited to, flash memory, volatile RAM, registers, or hard disk drives may also be used.

Figure 3:
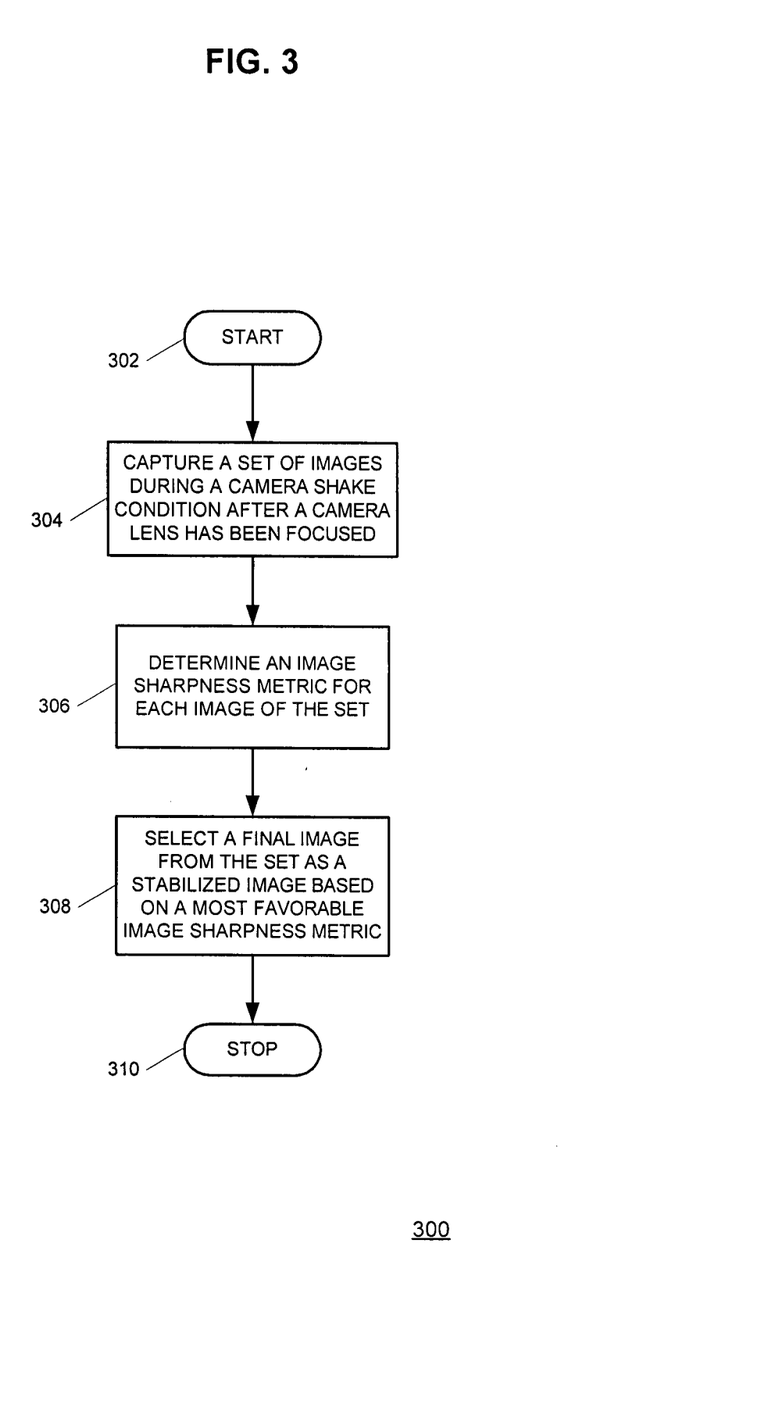
FIG. 3 is a flow chart illustrating one example of a method for hand shake effect image stabilization in accordance with one embodiment of the present disclosure.

FIG. 3 illustrates one method of hand shake effect image stabilization 300, in accordance with one embodiment of the present disclosure. The method 300 starts at block 302. One example of starting the method 300 is a user initiating an auto focus operation such as by half-pressing a button through a user interface 108 to send a half-press signal 118 as illustrated in FIG. 1. The method 300 continues at block 304 where a set of images is captured during a camera shake condition after a camera lens has been focused. In one example, the number of images in the set is pre-defined, such as 10 frames. Alternatively, a user may determine the quantity of images in the set through user interface 108. The set of images may be captured, for example, sequentially at a fixed frame rate from camera 102 to the image capture logic 136 as illustrated in FIG. 1. Each time a new frame is captured, new image sharpness metric information is calculated for that image and compared with the currently stored more favorable metric information. Thus, only two frames and two metrics need be stored at any one time, although any number of frames can be stored.

The method 300 continues at block 306 where an image sharpness metric information is determined for each image of the set captured in block 304. In one example, statistical logic 220 in the image sharpness metric logic 120 calculates an image sharpness metric information for each image as images are captured and transmitted to the VUP 142 as illustrated in FIG. 2. As previously discussed, several statistical algorithms used to calculate image metrics are commonly known in the art. For example, a ID Laplacian algorithm may be used. It will be recognized by one having ordinary skill in the art that image sharpness metric information may be determined using a variety of methods.

The method 300 continues at block 308 where a final image is selected from the set as a stabilized image based on a most favorable image sharpness metric information. In one example, the most favorable image sharpness metric information is determined by image stabilization logic 152 as illustrated in FIG. 1.

The method 300 concludes at block 310. In one example, the stabilized image selected in block 308 may be stored to a host memory 216 as illustrated in FIG. 2, further processed, transmitted to display 114 as illustrated in FIG. 1, stored on removable memory, sent wirelessly or otherwise used. In one example, the stabilized image is stored in JPEG format. However, any suitable file format may be used.

Figure 4:
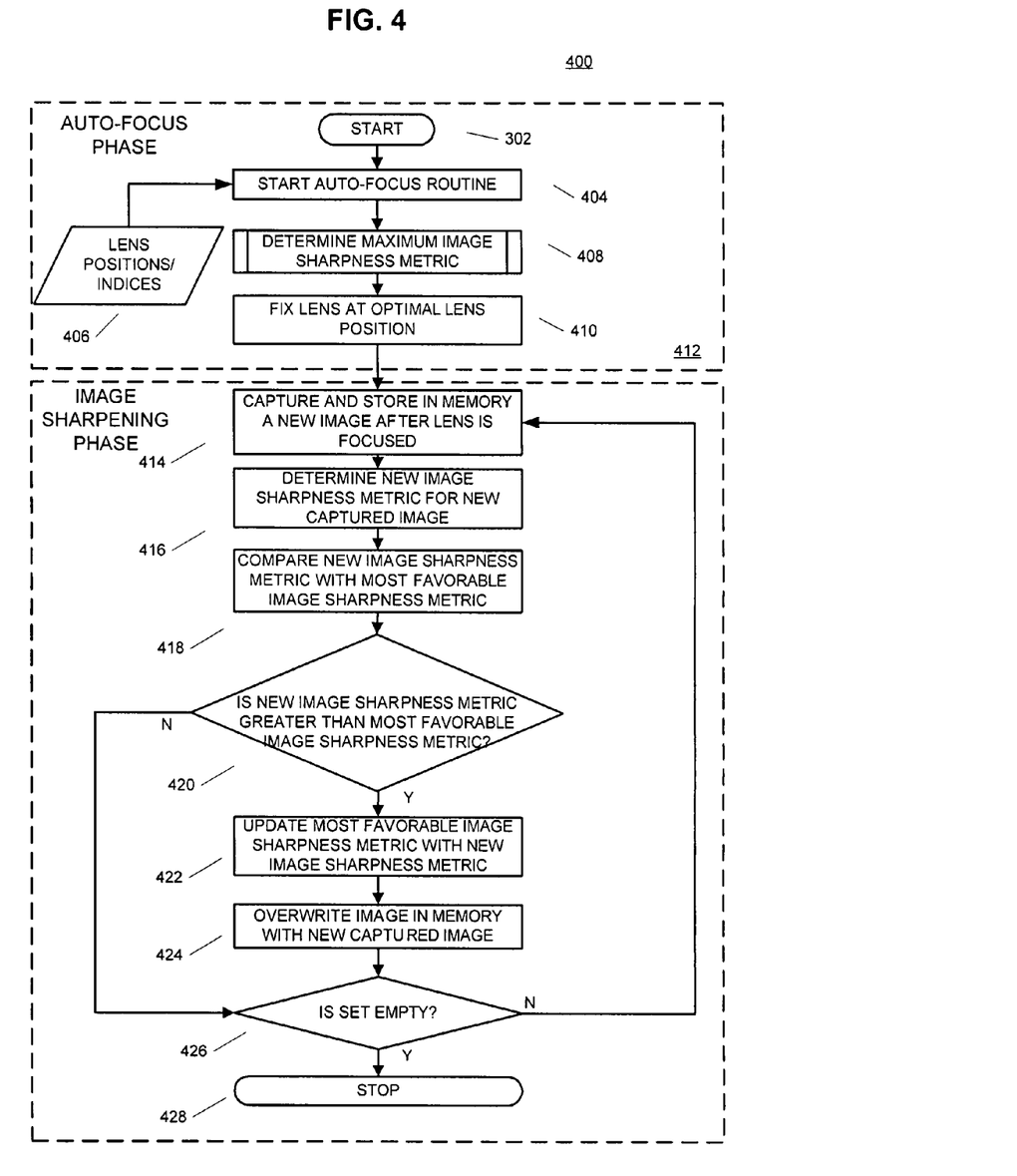
FIG. 4 is a flow chart illustrating another example of a method for hand shake effect image stabilization in accordance with one embodiment of the present disclosure.

FIG. 4 illustrates another method of hand shake effect image stabilization 400, in accordance with one embodiment of the present disclosure. Method 400 starts at block 302 and may be implemented as illustrated in FIG. 3.

The method 400 continues at block 404 where the auto-focus routine is started. In one example, a set of lens positions or indices 406 is received by the auto-focus routine which may capture images at one or more lens positions selected from the set of lens positions or indices 406. The set of lens positions or indices 406 may be stored in any memory such as, but not limited to, include, a register, nonvolatile or volatile random access memory (RAM), programmable read only memory (EPROM, EEPROM), or flash memory. In one example, an auto-focus circuit 122 transmits lens positions or indices 406 to the camera 102 through a focus driver 138 as illustrated in FIG. 1. The auto-focus circuit may contain image capture logic 136 which receives image pixel information 134 at each lens position or indices 406 as illustrated in FIG. 1.

The method 400 continues at block 408 where the maximum image sharpness metric information is determined. In one example, images captured at the one or more lens positions in block 404 are transmitted to the image sharpness metric logic 120 as illustrated in FIG. 1.

The method 400 continues at block 410 where the lens is fixed at an optimal lens position. In one example, auto-focus circuit 122 receives a signal 140 from the image sharpness metric logic 120 indicating the optimal lens position and controls camera 102 accordingly through focus driver 126 as illustrated in FIG. 1.

In one example, the methods of blocks 302 and 404-410 are performed as an auto-focus phase 412. It will be recognized any suitable variation of auto-focus phase 412 where the end result is a lens fixed at an optimal lens position as in block 410 may be used in accordance with the present invention.

The method 400 continues at block 414 where a new image is captured and stored in memory after the lens is focused. In one example, image capture logic 136 receives image pixel information 134 from camera 102 as illustrated in FIG. 1.

The method 400 continues at block 416 where a new image sharpness metric information for the image captured in block 414 is determined. As discussed earlier, several statistical algorithms used to calculate image metrics are commonly known in the art.

The method 400 continues at block 418 where the new image sharpness metric information determined in block 416 is compared with the most favorable image sharpness metric information. The method 400 continues at block 420 where a determination is made whether the new image sharpness metric information value is greater than the most favorable image sharpness metric information. As discussed earlier, If the image sharpness metric information is associated with a first captured image of the set, the image sharpness metric information is stored as a most favorable image sharpness metric information.

If block 420 determines the new image sharpness metric information is greater than the most favorable image sharpness metric information, then method 400 continues at block 422 where the most favorable image sharpness metric information is updated with the new image sharpness metric information determined in block 416. Method 400 then continues at block 424 where the most favorable image stored in memory is overwritten by the new image captured at block 414. In one example, an encode output control 156 signal is transmitted from decision logic 204 to JPEG encode logic 148 and JPEG encode logic 148 overwrites the previous image with the most favorable image sharpness metric information stored in JPEG buffers 206 or 208 with the new image as illustrated in FIG. 2.

Method 400 continues at block 426. If block 420 determines the new image sharpness metric information is not greater than the most favorable image sharpness metric information, then method 400 continues at block 426 from block 420 where it is determined whether the set of captured images is empty. If the set is not empty, then method 400 continues at block 414 with a new image captured. If the set is empty, method 400 continues at block 428 where the method stops. In one example, the remaining most favorable image stored in memory at block 424 is the final image and becomes the stabilized image retained in host memory 216 as illustrated in FIG. 2.

Also, the above operations may be distributed among differing devices. For example, an offline processing approach may be used, such that the cellphone need not contain the circuits necessary to determine the best frame. A video containing a set of images that were captured at a same lens position may be downloaded from the cellphone to another device such as a computer and examined by the computer to provide the final image using the operations described above.

For example the cellphone may capture the set of images at the same lens position and download the images (and the image metric if it is generated by the cellphone) to a computer. The computer may then determine the final image. In one example a user may select an image (or time stamp) as the desired final image for printing or storage but the computer may choose a different frame either previous in time or later in time than the one selected by the user if an image sharpness metric is higher for another frame in the set of frames close in time to the one selected.

Among other advantages, a handheld device capable of hand shake effect image stabilization for images captured with a camera, minimizes the need for additional hardware and in one embodiment re-uses existing focus metric information logic to determine an image sharpness metric information used for hand shake deblurring. The method and apparatus also minimize the need for additional video memory as one embodiment utilizes only two JPEG buffers. Among other advantages, the reduced hardware and memory requirements of the method and apparatus also reduces the power consumption compared with other solutions.

It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein.

What is claimed is:

1. A method for storing a stabilized image, comprising:
    autofocusing a lens through a series of lens positions until a final lens position is determined;
    determining image sharpness metric information for a set of images captured at the final lens position by calculating a sharpness metric value for each pixel in a plurality of regions of interest in the set of images, wherein each region of interest comprises a plurality of adjacent pixels, wherein each pixel comprises information captured from the lens;
    selecting a final image frame from the set as the stabilized image based on the most favorable image sharpness metric information;
    encoding the final image frame to create an encoded final image frame;
    processing at least one image frame from the set for display before encoding the final image frame;
    displaying the at least one image frame to a display; and
    storing the encoded final image frame in a memory linked to a camera.

2. The method of claim 1, wherein selecting the final image frame includes:
    comparing two image sharpness metric informations associated with two image frames in the set and determining the most favorable image sharpness metric information between the two image frames.

3. The method of claim 1, further comprising:
    if the determining of the image sharpness metric information is performed on a first image frame of the set, then storing the image frame and associated image sharpness metric information as a most favorable image sharpness metric;
    comparing a next image sharpness metric information of the set to the most favorable image sharpness metric information and determining a new most favorable image sharpness metric;
    updating the most favorable image sharpness metric information and the next image sharpness metric; and
    comparing each updated next sharpness metric information of the set to each updated most favorable image sharpness metric information until the set is empty.

4. The method of claim 1, further comprising capturing the set of images during a camera shake condition, and wherein a quantity of images in the set to be compared is determined by a user.

5. A method for selecting a stabilized image, comprising:
    autofocusing a lens through a series of lens positions until a final lens position is determined, based at least in part, on auto-focus image statistics logic;
    capturing a set of images during a camera shake condition at the final lens position;
    dividing each image of the set into a plurality of regions of interest, wherein each region of interest comprises a plurality of adjacent pixels;
    determine an image sharpness metric information for each image of the set by performing statistical analysis on each region of interest, based on at least in part, on the auto-focus image statistics logic, by calculating a sharpness metric value for each pixel in the plurality of regions of interest in the set of images, wherein each pixel comprises information captured from the lens; and
    selecting a final image from the set as the stabilized image based on a most favorable image sharpness metric.

6. The method of claim 5, wherein selecting the final image includes:
    comparing two image sharpness metrics associated with two images in the set and determining a most favorable image sharpness metric information between the two images; and
    storing the most favorable image sharpness metric information and the associated image.

7. The method of claim 5, further comprising:
    if the determining of the image sharpness metric information is performed on a first image of the set, then storing the image and associated image sharpness metric information as a most favorable image sharpness metric;
    comparing a next image sharpness metric information of the set to the most favorable image sharpness metric information and determining a new most favorable image sharpness metric;
    updating the most favorable image sharpness metric information and the next image sharpness metric;
    comparing each updated next sharpness metric information of the set to each updated most favorable image sharpness metric information until the set is empty; and
    storing the image associated with a final most favorable image sharpness metric information as a stabilized image.

8. The method of claim 5, wherein a quantity of images in the set to be compared is determined by a user.

9. A circuit in a camera for selecting a stabilized image, comprising:
    autofocusing logic operative to autofocus a lens through a series of lens positions until a final lens position is determined;
    image capturing logic operative to capture a set of images during a camera shake condition at the final lens position;
    an image sharpness metric circuit operative to determine image sharpness metrics for each image frame of the set of images by calculating a sharpness metric value for each pixel in a plurality of regions of interest in the set of images, wherein each region of interest comprises a plurality of adjacent pixels, wherein each pixel comprises information captured from the lens;

memory operative to store the captured images and associated image sharpness metrics from the image sharpness metric circuit;

image stabilization logic operative to select a final image frame from the set as the stabilized image based on a most favorable image sharpness metric;

encoding logic operative to encode the final image frame as a final encoded image frame; and processing logic operative to process at least one image frame from the set for display before the encoding logic encodes the final image frame, wherein the at least one image frame is displayed to a display.

10. The circuit in claim 9, wherein a first address in the memory is operative to store a new image sharpness metric information and a new associated image from the image sharpness metric circuit and a second address in the memory is operative to store a current most favorable image sharpness metric information and an associated image.

11. The circuit in claim 9, wherein the image stabilization logic, comprises:
comparator logic operative to compare the image sharpness metrics stored in the first and second addresses in memory; and
decision logic operative to output a signal indicating which address in memory contains the most favorable image sharpness metric.

12. The circuit in claim 9, wherein the image sharpness metric circuit, comprises a statistical block operative to analyze image pixel information of an image and generate a statistical image sharpness metric information from the image pixel information.

13. An apparatus in a camera for selecting a stabilized image comprising:
autofocusing logic operative to autofocus a lens through a series of lens positions until a final lens position is determined;
an image sharpness metric circuit operative to determine image sharpness metrics for each image frame of a set of images that were captured at the final lens position by calculating a sharpness metric value for each pixel in a plurality of regions of interest in the set of images, wherein each region of interest comprises a plurality of adjacent pixels, wherein each pixel comprises information captured from the lens;
memory operative to store the captured images and associated image sharpness metrics from the image sharpness metric circuit;
image stabilization logic operative to select a final image frame from the set as the stabilized image based on a most favorable image sharpness metric;
a display operative to display the stabilized image frame;
encoding logic operative to encode the final image frame as a final encoded image frame; and
processing logic operative to process at least one image frame from the set for display before the encoding logic encodes the final image frame, wherein the at least one image frame is displayed to a display.

14. The apparatus of claim 13, wherein the apparatus is a handheld device which communicates with a radio telephone subsystem.

15. The apparatus of claim 13, wherein:
a first address in the memory is operative to store a new image sharpness metric information and a new associated image from the image sharpness metric circuit and a second address in the memory is operative to store a current most favorable image sharpness metric information and an associated image.

16. The apparatus of claim 13, wherein the image stabilization logic includes:
comparator logic operative to compare the image sharpness metrics stored in the first and second addresses in memory; and
decision logic operative to output a signal indicating which address in memory contains the most favorable image sharpness metric.

17. The apparatus of claim 13, wherein the image sharpness metric circuit comprises a statistical block operative to analyze image pixel information of an image and generate a statistical image sharpness metric information from the image pixel information.

18. The apparatus of claim 13, further comprising image capturing logic operative to capture the set of images during a camera shake condition.

19. A mobile device having a camera, comprising:
means for autofocusing a lens through a series of lens positions until a final lens position is determined;
means for determining image sharpness metric information for each image frame of a set of images that were captured at the final lens position by calculating a sharpness metric value for each pixel in a plurality of regions of interest in the set of images, wherein each region of interest comprises a plurality of adjacent pixels, wherein each pixel comprises information captured from the lens;
means for selecting a final image frame from the set as a stabilized image based on most favorable image sharpness metric information;
means for encoding the final image frame to create an encoded final image;
means for processing at least one image frame from the set for display before encoding the final image frame;
means for displaying the at least one image frame to a display; and
means for storing the encoded final image frame in a memory linked to the camera.

20. The mobile device of claim 19, wherein the means for selecting the final image frame includes:
means for comparing two image sharpness metric informations associated with two images in the set and determining the most favorable image sharpness metric information between the two images.

21. The mobile device of claim 19, further comprising:
means for storing the image and associated image sharpness metric information as a most favorable image sharpness metric for a first image of the set;
means for comparing a next image sharpness metric information of the set to the most favorable image sharpness metric information and determining a new most favorable image sharpness metric;
means for updating the most favorable image sharpness metric information and the next image sharpness metric; and
means for comparing each updated next sharpness metric information of the set to each updated most favorable image sharpness metric information until the set is empty.

22. The mobile device of claim 19 further comprising means for capturing the set of images during a camera shake condition and means for determining from a user input a quantity of images in the set to be compared.

23. A mobile device, comprising:
means for autofocusing a lens through a series of lens positions until a final lens position is determined;

means for capturing a set of images during a camera shake condition at the final lens position;

means for dividing each image of the set into a plurality of regions of interest;

means for reusing auto-focus image statistics logic to determine an image sharpness metric information for each image of the set by performing statistical analysis on each region of interest by calculating a sharpness metric value for each pixel in each region of interest, wherein each pixel comprises information captured from the lens; and means for selecting a final image from the set as a stabilized image based on a most favorable image sharpness metric.

24. The mobile device of claim 23, wherein the means for selecting the final image includes:

means for comparing two image sharpness metrics associated with two images in the set and determining a most favorable image sharpness metric information between the two images; and means for storing the most favorable image sharpness metric information and the associated image.

25. The mobile device of claim 23, further comprising:

means for storing the image and associated image sharpness metric information as a most favorable image sharpness metric for a first image of the set;

means for comparing a next image sharpness metric information of the set to the most favorable image sharpness metric information and determining a new most favorable image sharpness metric;

means for updating the most favorable image sharpness metric information and the next image sharpness metric;

means for comparing each updated next sharpness metric information of the set to each updated most favorable image sharpness metric information until the set is empty; and means for storing the image associated with a final most favorable image sharpness metric information as a stabilized image.

26. The mobile device of claim 23, further comprising means for determining from a user input a quantity of images in the set to be compared.

27. A non-transitory computer-readable media comprising instructions executable by a processor to perform a method in a camera for storing a stabilized image, the computer-readable media comprising:

instructions for autofocusing a lens through a series of lens positions until a final lens position is determined;

instructions for determining image sharpness metric information for each image of a set of images that were captured at the final lens position by calculating a sharpness metric value for each pixel in a plurality of regions of interest in the set of images, wherein each region of interest comprises a plurality of adjacent pixels, wherein each pixel comprises information captured from the lens;

instructions for selecting a final image frame from the set as the stabilized image based on most favorable image sharpness metric information;

instructions for encoding the final image frame to create an encoded final image;

instructions for processing at least one image frame from the set for display before encoding the final image frame;

instructions for displaying the at least one image frame to a display; and instructions for storing the encoded final image frame in a memory linked to the camera.

28. The non-transitory computer-readable media of claim 27, wherein instructions for selecting the final image frame includes instructions for comparing two image sharpness metric informations associated with two images in the set and determining the most favorable image sharpness metric information between the two images.

29. The non-transitory computer-readable media of claim 27, further comprising:

instructions for storing the image frame and associated image sharpness metric information as a most favorable image sharpness metric for a first image frame of the set;

instructions for comparing a next image sharpness metric information of the set to the most favorable image sharpness metric information and determining a new most favorable image sharpness metric;

instructions for updating the most favorable image sharpness metric information and the next image sharpness metric; and instructions for comparing each updated next sharpness metric information of the set to each updated most favorable image sharpness metric information until the set is empty.

30. The non-transitory computer-readable media of claim 27 further comprising instructions for capturing the set of images during a camera shake condition and instructions for determining from a user input a quantity of images in the set to be compared.

31. A non-transitory computer-readable media comprising instructions executable by a processor to perform a method for selecting a stabilized image, the computer-readable media comprising:

instructions for autofocusing a lens through a series of lens positions until a final lens position is determined;

instructions for capturing a set of images during a camera shake condition at the final lens position;

instructions for dividing each image of the set into regions of interest;

instructions for reusing auto-focus image statistics logic to determine an image sharpness metric information for each image of the set by performing statistical analysis on each region of interest and by calculating a sharpness metric value for each pixel in each region of interest, wherein each pixel comprises information captured from the lens; and instructions for selecting a final image from the set as the stabilized image based on a most favorable image sharpness metric.

32. The non-transitory computer-readable media of claim 31, wherein instructions for selecting the final image comprises:

instructions for comparing two image sharpness metrics associated with two images in the set and determining a most favorable image sharpness metric information between the two images; and instructions for storing the most favorable image sharpness metric information and the associated image.

33. The non-transitory computer-readable media of claim 31, further comprising:

instructions for storing the image and associated image sharpness metric information as a most favorable image sharpness metric for a first image of the set;

instructions for comparing a next image sharpness metric information of the set to the most favorable image sharpness metric information and determining a new most favorable image sharpness metric;

instructions for updating the most favorable image sharpness metric information and the next image sharpness metric;

instructions for comparing each updated next sharpness metric information of the set to each updated most favorable image sharpness metric information until the set is empty; and instructions for storing the image associated with a final most favorable image sharpness metric information as a stabilized image.

34. The non-transitory computer-readable media of claim 31 further comprising instructions for determining from a user input a quantity of images in the set to be compared.

35. The method of claim 1, wherein the encoded final image frame corresponds to an image frame having a reduced camera shake effect relative to the set of images.

36. The method of claim 1, wherein the sharpness metric is a squared laplacian sharpness metric.

37. The mobile device of claim 19, wherein the mobile device comprises a mobile phone.

38. The method of claim 1, further comprising scanning pixel information across a horizontal dimension of an image in the set of images such that all regions of interest in a row are processed simultaneously.

39. The method of claim 1, wherein each region of interest comprises an unprocessed value for each of the plurality of adjacent pixels.

* * * * *